US012305144B2

(12) United States Patent
Bruse et al.

(10) Patent No.: US 12,305,144 B2
(45) Date of Patent: May 20, 2025

(54) OIL PROCESSING SYSTEMS AND METHODS FOR MANUFACTURING A REFINED VEGETABLE OIL

(71) Applicant: Cargill, Incorporated, Wayzata, MN (US)

(72) Inventors: Falk Bruse, Drensteinfurt (DE); Armin Willem-Friedrich Hermann Tarnow, Rotterdam (NL); Gijsbertus Johannes Van Rossum, Spijkenisse (NL); Ignacio Vilas Eguileta, Spijkenisse (NL)

(73) Assignee: Cargill, Incorporated, Wayzata, MN (US)

( * ) Notice: Subject to any disclaimer, the term of this patent is extended or adjusted under 35 U.S.C. 154(b) by 618 days.

(21) Appl. No.: 17/441,081

(22) PCT Filed: Mar. 11, 2020

(86) PCT No.: PCT/US2020/022064
§ 371 (c)(1),
(2) Date: Sep. 20, 2021

(87) PCT Pub. No.: WO2020/197770
PCT Pub. Date: Oct. 1, 2020

(65) Prior Publication Data

US 2022/0186139 A1 Jun. 16, 2022

(30) Foreign Application Priority Data

Mar. 22, 2019 (EP) .................................... 19164598

(51) Int. Cl.
*C11B 3/06* (2006.01)
*C11B 3/10* (2006.01)

(52) U.S. Cl.
CPC . *C11B 3/06* (2013.01); *C11B 3/10* (2013.01)

(58) Field of Classification Search
CPC . B67C 7/0073; B67C 2003/228; A61L 2/208; A61L 2/22; A61L 2202/23
USPC .......................................................... 426/397
See application file for complete search history.

(56) References Cited

U.S. PATENT DOCUMENTS

| | | | | | |
|---|---|---|---|---|---|
| 2,618,644 | A * | 11/1952 | Bailey | C11B 3/10 554/191 |
| 2013/0302881 | A1 | 11/2013 | Bhaggan | |
| 2013/0323394 | A1* | 12/2013 | Bruse | C11B 3/10 426/590 |
| 2015/0166930 | A1 | 6/2015 | Hed | |

FOREIGN PATENT DOCUMENTS

| | | | |
|---|---|---|---|
| CN | 101397504 | B | 1/2013 |
| CN | 102311872 | B | 4/2014 |
| EP | 2457648 | A1 | 5/2012 |
| EP | 2471897 81 | | 10/2017 |
| RU | 2167535 | C1 | 5/2001 |
| RU | 2012106132 | A | 8/2013 |
| RU | 2680690 | C2 | 2/2019 |
| WO | 2008003154 | A1 | 1/2008 |
| WO | 2011040539 | A1 | 4/2011 |
| WO | 2012107230 | A1 | 8/2012 |
| WO | 2015174820 | A1 | 11/2015 |
| WO | 2018217856 | A1 | 11/2018 |

OTHER PUBLICATIONS

Textbooks for Secondary Vocational Schools, Basic Organic Chemical Factory Equipment (2ed edition), Jul. 31, 2004, Zhao Jiemin, Chemical Industry Press, p. 9.
"Study on the Process for the Synthesis of Thiophenol Compounds in Pipe reactor", Xie Dong, Chinese Master's Theses Full-text Database Engineering Science and Technology I, No. 8, Aug. 15, 2016, pp. B016-B076.

* cited by examiner

*Primary Examiner* — Brent T O'Hern

(57) ABSTRACT

A process for manufacturing a refined vegetable oil having a reduced content of 3-monochloropropane-1.2-diol fatty acid (3-MCPD) esters characterized in that it comprises the following steps: treating a deodorized vegetable oil with a base in a continuous pipe reactor, and contacting the base treated oil with an adsorbent and/or an acid. The thus obtained oil is low in 3-MCPD and has a low degree of interesterification and a low dialkylketones (DAK) content. It further relates to the use a continuous pipe reactor for treating a deodorized vegetable oil with a base wherein 3-MCPD ester content is reduced in the oil.

19 Claims, No Drawings

OIL PROCESSING SYSTEMS AND METHODS FOR MANUFACTURING A REFINED VEGETABLE OIL

CROSS REFERENCE TO RELATED APPLICATIONS

This application is a national phase application of PCT/US2020/022064, filed Mar. 11, 2020, which claims the benefit of European Patent Application No. 19164598.5, filed Mar. 22, 2019, which are hereby incorporated by reference in their entirety.

FIELD OF THE INVENTION

The present invention relates to a novel process for producing refined oils low in 3-monochloropropane-1,2-diol fatty acid (3-MCPD) esters content and with a low degree of interesterification and a low dialkylketones (DAK) content.

BACKGROUND OF THE INVENTION

Crude oils, as extracted from their original source, are not suitable for human consumption due the presence of impurities—such as free fatty acids, phosphatides, metals and pigments—which may be harmful or may cause an undesirable colour, odour or taste. Crude oils are therefore refined before use. The refining process typically consists of three major steps: degumming, bleaching and deodorizing. An oil obtained after completion of the refining process (called a "refined oil" or more specifically a deodorized oil) is normally considered suitable for human consumption and may therefore be used in the production of any number of foods and beverages.

Unfortunately, it has now been found that the refining process itself contributes to the introduction, into the refined oil, of high levels of 3-monochloropropane-1,2-diol fatty acid esters (3-MCPD esters), 2-chloro-1,3-propanediol fatty acid esters (2-MCPD esters) and glycidyl esters (GE). 3-MCPD esters, 2-MCPD esters and glycidyl esters (GE) are produced as a result of the oils being exposed to high temperatures during processing, in particular during deodorization.

A lot has been discussed and described in order to understand the mechanism of the formation, mitigation and reduction of 2- and 3-MCPD fatty acid esters and glycidyl esters.

WO2014/012759 describes a process for reducing MCPD compounds in refined plant oil for food.

WO2012/031176 describes the elimination of organohalo and oxiranes species in carboxylic acid ester streams.

EP 3 321 348 further describes a process for refining vegetable oil with suppression of unwanted impurities.

There is still a need in the industry to identify an efficient and effective method of producing refined oils with low 3-MCPD ester levels, without modifying the triglyceride structure and/or without increasing content of process contaminants. The present invention provides such a process.

SUMMARY OF THE INVENTION

According to a first aspect of the present invention, there is provided a process for manufacturing a refined vegetable oil having a reduced content of 3-MCPD esters characterized in that it comprises the following steps:

a) Treating a deodorized vegetable oil with a base in a continuous pipe reactor, b) Contacting the base-treated oil with an adsorbent and/or acid.

According to a further aspect of the present invention, there is provided the use of a continuous pipe reactor for treating a deodorized vegetable oil with a base.

DETAILED DESCRIPTION

The present invention provides a process for manufacturing a refined vegetable oil having a reduced content of 3-MCPD esters characterized in that it comprises the following steps:

a) Treating a deodorized vegetable oil with a base in a continuous pipe reactor, b) Contacting the base treated oil with an adsorbent and/or an acid.

Deodorized Vegetable Oil

The deodorized vegetable oil in step a) of the process of the invention is a deodorized edible oil.

The vegetable oil may be derived from one or more vegetable sources and may include oils and/or fats from a single origin or blends of two or more oils and/or fats from different sources or with different characteristics. They may be derived from standard oils or from specialty oils such as oils that have been subjected to fractionation and so on. Examples of suitable vegetable oils include: soybean oil, corn oil, cottonseed oil, palm oil, palm kernel oil, peanut oil, rapeseed oil, safflower oil, sunflower oil, sesame seed oil, rice bran oil, coconut oil, canola oil and any fractions or derivatives thereof, preferably palm oil.

Palm oil is encompassing palm oil, as well as palm oil fractions such as stearin and olein fractions (single as well as double fractionated, and palm mid fractions) and blends of palm oil and/or its fractions. Thus, in the context of the present invention, the vegetable deodorized oil is preferably palm oil, palm oil stearin, palm oil super stearin, palm oil olein, palm oil super olein, palm oil mid-fraction or blends of one or more thereof.

Typically, a deodorized vegetable edible oil may be obtained by means of 2 major types of refining processes, i.e. a chemical or a physical refining process. The chemical refining process may typically comprise the major steps of degumming, alkali refining, also called alkali neutralization, bleaching and deodorizing. The thus obtained deodorized oil is a chemically refined oil, also called "NBD" oil. Alternatively, the physical refining process may typically comprise the major steps of degumming, bleaching and deodorizing. A physically refining process is not comprising an alkali neutralization step as is present in the chemical refining process. The thus obtained deodorized oil is a physically refined oil, also called "RBD" oil.

In one aspect of the invention, the deodorized vegetable oil in step a) of the present process is a physically refined oil.

The crude vegetable oil may be subjected to one or more degumming steps. Any of a variety of degumming processes known in the art may be used. One such process (known as "water degumming") includes mixing water with the oil and separating the resulting mixture into an oil component and an oil-insoluble hydrated phosphatides component, sometimes referred to as "wet gum" or "wet lecithin". Alternatively, phosphatide content can be reduced (or further reduced) by other degumming processes, such as acid degumming (using citric or phosphoric acid for instance), enzymatic degumming (e.g., ENZYMAX from Lurgi) or chemical degumming (e.g., SUPERIUNI degumming from Unilever or TOP degumming from VandeMoortele/Dijkstra CS). Alternatively, phosphatide content can also be reduced (or further reduced) by means of acid conditioning, wherein the oil is treated with acid in a high shear mixer and subsequently sent without any separation of the phosphatides to the bleaching step. If a degumming step is used, it will preferably precede the first bleaching step.

The bleaching step in general is a process step whereby impurities are removed to improve the color and flavor of the oil. It is typically performed prior to deodorization. The nature of the bleaching step will depend, at least in part, on the nature and quality of the oil being bleached. Generally, a crude or partially refined oil will be mixed with a bleaching agent which combines, amongst others, with oxidation products, phosphatides, trace soaps, pigments and other compounds to enable their removal. The nature of the bleaching agent can be selected to match the nature of the crude or partially refined oil to yield a desirable bleached oil. Bleaching agents generally include natural or "activated" bleaching clays, also referred to as "bleaching earths", activated carbon and various silicates. Natural bleaching agent refers to non-activated bleaching agents. They occur in nature or they occur in nature and have been cleaned, dried, milled and/or packed ready for consumption. Activated bleaching agent refers to bleaching agents that have been chemically modified, for example by activation with acid or alkali, and/or bleaching agents that have been physically activated, for example by thermal treatment. Activation includes the increase of the surface in order to improve the bleaching efficiency.

Further, bleaching clays may be characterized based on their pH value. Typically, acid-activated clays have a pH value of 2.0 to 5.0. Neutral clays have a pH value of 5.5 to 9.0. A skilled person will be able to select a suitable bleaching agent from those that are commercially available based on the oil being refined and the desired end use of that oil.

In one aspect of the invention, the method for obtaining the deodorized vegetable oil that is used in step a) of the process, is comprising a bleaching step followed by a deodorization step.

The bleaching step takes place at a temperature of from 80 to 115° C., from 85 to 110° C., from 90 to 105° C., or 95 to 100° C., in presence of neutral and/or natural bleaching earth in an amount of from 0.2 to 5%, from 0.5 to 3%, from 0.7 to 1.5%.

The thus obtained bleached oil is subjected to a deodorization for preparing the deodorized vegetable oil that is used in step a) of the present process.

Deodorization is a process whereby free fatty acids (FFAs) and other volatile impurities are removed by treating (or "stripping") a crude or partially refined oil under vacuum with sparge steam, nitrogen or other gasses. The deodorization process and its many variations and manipulations are well known in the art and the deodorization step of the present invention may be based on a single variation or on multiple variations thereof.

For instance, deodorizers may be selected from any of a wide variety of commercially available systems (such as those sold by Krupp of Hamburg, Germany; De Smet Group, S.A. of Brussels, Belgium; Gianazza Technology s.r.l. of Legnano, Italy; Alfa Laval AB of Lund, Sweden; Crown Ironworks of the United States, or others ). The deodorizer may have several configurations, such as horizontal vessels or vertical tray-type deodorizers.

Deodorization is typically carried out at elevated temperatures and reduced pressure to better volatilize the FFAs and other impurities. The precise temperature and pressure may vary depending on the nature and quality of the oil being processed. The pressure, for instance, will preferably be no greater than 10 mm Hg but certain aspects of the invention may benefit from a pressure below or equal to 5 mm Hg, e.g., 1-4 mm Hg. The temperature in the deodorizer may be varied as desired to optimize the yield and quality of the deodorized oil. At higher temperatures, reactions which may degrade the quality of the oil will proceed more quickly. For example, at higher temperatures, cis-fatty acids may be converted into their less desirable trans form. Operating the deodorizer at lower temperatures may minimize the cis-to-trans conversion, but will generally take longer or require more stripping medium or lower pressure to remove the requisite percentage of volatile impurities. As such, deodorization is typically performed at a temperature of the oil in a range of 200 to 280° C., with temperatures of about 220-270° C. being useful for many oils. Typically, deodorization is thus occurring in a deodorizer whereby volatile components such as FFAs and other unwanted volatile components that may cause off-flavors in the oil, are removed. Deodorization may also result in the thermal degradation of unwanted components.

In one aspect of the invention, in the method for obtaining the deodorized vegetable oil that is used in step a) of the present process, the vegetable edible oil is deodorized at a temperature of from 200 to 270° C., from 210 to 260° C., from 215 to 250° C., from 215 to 245° C., or from 220 to 240° C. The deodorization is taking place for a period of time from 30 min to 240 min, from 45 min to 180 min, from 60 min to 150 min, from 90 min to 120 min.

In one more aspect of the invention, in the method for obtaining the deodorized vegetable oil that is used in step a) of the present process, the deodorization occurs in the presence of sparge steam in a range of from 0.50 to 2.50%, from 0.75 to 2.00%, from 1.00 to 1.75%, or from 1.25 to 1.50% and at an absolute pressure of 7 mbar or less, 5 mbar or less, 3 mbar or less, 2 mbar or less.

In yet another aspect of the invention, the method for obtaining the deodorized vegetable oil that is used in step a) of the present process is comprising the steps, in order, of:

i) Bleaching the vegetable oil
   - at a temperature of from 80 to 115° C., from 85 to 110° C., from 90 to 100° C., or 95 to 105° C.,
   - with neutral and/or natural bleaching earth in an amount of from 0.2 to 5%, from 0.5 to 3%, from 0.7 to 1.5%, and ii) Deodorizing the vegetable oil
   - at a temperature of from 200 to 270° C., from 210 to 260° C., from 215 to 250° C., from 215 to 245° C., or from 220 to 240° C.,
   - for a period of time from 30 min to 240 min, from 45 min to 180 min, from 60 min to 150 min, from 90 min to 120 min.

The deodorized vegetable oil used in step a) of the present process has a content of 3-MCPD esters that is 2.5 ppm or more, 3 ppm or more, 3.5 ppm or more, 4 ppm or more, 4.5 ppm or more, or even 5 ppm or more.

The deodorized vegetable oil used in step a) of the present process has a content of GE that is 1 ppm or more, 2 ppm or more, 3 ppm or more, 4 ppm or more, 5 ppm or more, 10 ppm or more, or even 15 ppm or more.

The method for preparing the deodorized oil used in step a) of the present process may also optionally include steps that may have a beneficial effect on the prevention of formation and/or mitigation of unwanted process contaminants such as 3-MCPD and/or GE. These steps may be focused to reduce the content of chlorine, control the amount of phosphorous, include extra washing steps, use specific bleaching agents in significantly higher amounts than common processes, and the like.

The method may also include—be preceded or followed by—one or more blending steps. It may be desirable, for instance, to blend oils of different types or from multiple sources. For example, a number of crude or partially refined oils could be blended before step a) of the present process. Alternatively, two or more oils could be blended after the process of the present invention.

Process Step a)

The continuous pipe reactor in step a) of the process according to the invention is comprising at least one cylindrical vessel which is designed to be able to operate at a temperature from 100 to 250° C., and wherein the vessel is having at least one inlet suitable for deodorized vegetable edible oil and at least one outlet suitable for deodorized vegetable edible oil and characterized in that:

a) the reactor is having a height to diameter ratio from 3 to 20, and
b) the reactor is able to operate such that the deodorized vegetable edible oil has a retention time distribution with a standard deviation of max 40%.

The continuous pipe reactor in step a) of the process is a cylindrical vessel with an ellipsoidal or torispherical head and bottom. The reactor has a height to diameter ratio from 3.0 to 20.0, from 4.0 to 16.0, from 4.5 to 12.0, from 5.5 to 9.5, from 6.0 to 9.0, from 6.5 to 9.0. In the "height to diameter ratio", the diameter refers to the internal diameter of the reactor and the height refers to the height of the oil level in the reactor.

The continuous pipe reactor is having more than one inlet suitable for deodorized edible oil and/or it is suitable for one or more bases. The continuous pipe reactor may be equipped with multiple nozzles allowing injecting multiple streams of deodorized oil and/or multiple streams of the deodorized oil comprising the base.

Further, the continuous pipe reactor may comprise more than one cylindrical vessel. The more than one cylindrical vessel can be provided in any type of set-up, sequential, in a carousel or any other type of set-up as long as in a height to diameter ratio of each and every cylindrical vessel is from 3 to 20, from 4 to 16, from 4.5 to 12, from 5.5 to 9.5, from 6 to 9, from 6.5 to 9. In case of multiple cylindrical vessels, an approach of the plug flow is assured and the at least one inlet, and at least one outlet are set-up or designed to allow for such a flow of the deodorized oil comprising the base.

A base is added to the oil prior to entering the pipe reactor. The base may be added as a pure component or as a concentrated solution. The concentrated solution may be an aqueous solution with a concentration of from 5 to 50 weight %, from 10 to 40 weight %, from 15 to 35 weight %, from 20 to 30 weight %. The base may be added by means of a static or dynamic mixer, or the like, for obtaining the oil comprising the base. The oil comprising the base is subsequently injected into the pipe reactor. Preferably the oil comprising the base is running top-down through the continuous pipe reactor. The oil comprising the base may be running through the pipe reactor at an absolute pressure from −1.0 to +0.5 barg. This pressure may be obtained by means of water-vapor or nitrogen. Preferably, the oil comprising the base is running through the pipe reactor at atmospheric pressure.

The oil comprising the base may be added to the pipe reactor by means of one or more spray nozzles. A nozzle is known to be a device designed to control the direction or characteristics of the fluid flow.

The addition of the base by means of one or more spry nozzles allow the oil comprising the base to be evenly distributed over the whole cross section area of the oil surface in the top of the reactor, while minimally disrupting the flow regime through the pipe reactor.

The flow regime of oil comprising the base in the continuous pipe reactor is similar to, or is at least approaching the flow regime of an ideal plug flow pipe reactor. The flow regime in the reactor is measured by the retention time distribution and can be expressed as a type of Gaussian curve around a mean residence time. It is important that the standard deviation of this retention time around this mean residence time is small such that in principle the oil comprising the base is moving smoothly with minimal disruptions through the pipe reactor. The standard deviation of the retention time is not more than 40%, not more than 30%, not more than 20%, not more than 10% of the mean residence time. The standard deviation is determined by calculating computational fluid dynamics and simulation with a step tracer injection. The flow regime of the oil in the continuous pipe reactor is similar to, or is at least approaching the flow regime of an ideal plug flow pipe reactor.

The treatment with the base is performed without injecting steam or gas into the oil comprising the base. Consequently, the flow regime of the oil comprising the base, flowing through the continuous pipe reactor, is not disturbed by the use of steam or gas. This is considerably different to a standard tray deodorizer where sparge steam is continuously added below the oil surface.

The treatment with a base includes the addition of one or more bases. The "one or more bases" is selected from carbonate, bicarbonate, hydroxide, alkoxide, carboxylate and mixtures of two or more thereof. Preferable the one or more bases is comprising potassium hydroxide, sodium hydroxide, sodium palmitate and potassium palmitate. More preferably the one or more bases is comprising potassium hydroxide or potassium palmitate. Alternatively, the treatment with the base includes the addition of one or more bases and in situ formation of one or more carboxylates. In particular the carboxylate can be formed by adding one or more bases to the oil comprising a certain amount of free fatty acids.

In one aspect of the invention, the base or one or more bases is added in a concentration of from 0.06 to 2.35 mmol/kg oil, from 0.09 to 1.76 mmol/kg oil, from 0.12 to 1.47 mmol/kg, from 0.18 to 0.71 mmol/kg, from 0.29 to 0.59 mmol/kg, or from 0.35 to 0.41 mmol/kg.

This can be further expressed such that, when the base is a hydroxide, it added in a concentration of from 1.0 to 40.0 ppm of molar equivalents of hydroxide ions, from 1.5 to 30.0 ppm, from 2.0 to 25.0 ppm, from 3.0 to 12.0 ppm, from 5.0 to 10.0 ppm, from 6.0 to 7.0 ppm of molar equivalents of hydroxide ions. When the base is a palmitate, it added in a concentration of from 15.0 to 601.0 ppm, from 22.5 to 450.7 ppm, from 30.0 to 375.6 ppm, from 45.1 to 180.3 ppm, from 75.1 to 150.2 ppm, or from 90.1 to 105.2 of molar equivalents of palmitate ions The treatment with a base is performed at a temperature from 160 to 220° C., from 165° C. to 215° C., from 170° C. to 210° C., from 175 to 205° C., from 180° C. to 200° C., from 185 to 195° C., or from 190 to 195° C.

The mean retention time in the continuous pipe reactor is at least 30 minutes, at least 60 minutes, at least 90 minutes, at least 120 minutes, at least 130 minutes and up to 180 minutes.

The treatment with the base is reducing in the oil the content of the 3-MCPD esters below 2.5 ppm, below 1.9 ppm, below 1.8 ppm, 1.5 ppm, below 1.2 ppm, below 1 ppm, below 0.8 ppm. The treatment with the base is reducing the content of the 3-MCPD esters with more than 20%, more than 30%, more than 40%, more than 50%, more than 60%, more than 70%, more than 75%, more than 80%, more than 85%, more than 90%.

There is a potential risk that by adding one or more bases to the oil, unwanted interesterification of the oil, resulting in a rearrangement of the fatty acids over the triglyceride backbone occurs.

Commonly known in the art is the alkali interesterification of lipids, or also called a chemical interesterification, which is a process for randomly distributing the fatty acids over the triglyceride structure. Typically, such an alkali interesterification will result in a degree of interesterification of practically 100%.

The process of the current invention is not an alkali interesterification.

The treatment of the deodorized oil with the base in the continuous pipe reactor in step a) of the present process allows to keep the degree of interesterification below 12%, below 10%, below 7%, below 5%, below 4%, below 3.4%, below 3%, below 2.9%, even below 0.7%, below 0.3%.

By applying the continuous pipe reactor, the increase of the degree of interesterification per hour of retention time of the base-treated oil in the reactor is not significant, or is increasing by max 4%/h, max 3%/h, max 2.5%/h, or even max 1.5%/h.

Additionally, it is known that during a known alkali (chemical) interesterification of lipids, also compounds such as dialkylketones (DAKs) are formed. The DAKs are ketones having two (C10-C24) straight chain alkyl groups, where the alkyl groups may be the same or different. In those known reactions, concentrations even higher than 140 ppm may be formed. By applying the continuous pipe reactor for the present treatment of the deodorized oil with the base, the formation of DAK is kept below 6.0 ppm, below 4.0 ppm, below 2.0 ppm, below 1.5 ppm, below 1.0 ppm. The amount of DAK formed per hour of retention time of the base-treated oil in the reactor is not significant, or is increasing by max 2 ppm/h, max 1.5 ppm/h, or even max 1 ppm/h.

By applying the continuous pipe reactor, the degree of interesterification, in particular the increase of the degree of interesterification over time, as well as the DAK formation and the increase over time of the DAK formation is not significant. Moreover, applying the continuous pipe reactor allows to run a robust process that is not, or almost not, impacted by slight modifications of any of the parameters such as temperature, retention time, dosage of the base and the like.

In reality, several existing processes that incorporate a treatment with a base, are sensitive to slight modifications of any of the parameters such as temperature, retention time, dosage of the base and the like. These processes end up with a significant modification of the triglyceride structure (and thus a significant degree of interesterification), and/or formation of dialkylketones (DAKs). In particular, the existing process are thus less robust than the current claimed process and the application of the continuous pipe reactor allows an easier control of the process because it is less sensitive to fluctuations of the process parameters.

Without being bound by any theory, even while elongating the retention time due to stalling, or due to any other reason, the degree of interesterification and/or formation of DAKs is not significantly increased in the continuous pipe reactor. In fact, while securing or at least approaching a plug flow of the deodorized vegetable oil, an increase of retention time may eventually further reduce the content of 3-MCPD esters while maintaining or not significantly increasing the degree of interesterification and/or not significantly increasing the formation of DAKs.

So far in existing processes a treatment of oil with a base involves the use of deodorizer equipment. Usually the base is added to the oil at the level of the deodorization step at temperatures above 120° C.

To obtain the vacuum, existing continuous deodorizers are built up of several trays. Sparge steam is forced through the layers of oil in the different trays to remove the volatiles. As a result, such continuous deodorizers have a large volume, which results in a high investment cost, and have a high operational cost for maintaining the deep vacuum and generating the sparge steam.

The high volume of oil in the deodorizer and the constant turbulence of oil by the sparge steam are important causes for the lack of robustness of the existing processes.

It was surprisingly found that by applying a continuous pipe reactor in step a) of the current invention is reducing 3-MCPD in deodorized vegetable oil and that process step a) does not need sparge steam and/or is not operated under vacuum. There is no need for highly specialized deodorization equipment. The continuous pipe reactor has a smaller volume and as a result also a lower investment and operational cost compared to the traditional deodorizer equipment.

Process Step b)

The process of the present invention further includes a step b) of contacting the base treated oil with an adsorbent and/or an acid.

The adsorbent can be selected from bleaching agent, activated carbon, zeolite, exchange resin, silica and/or two or more combinations thereof. Examples of silica that can be employed in the present process include magnesium silicate, calcium silicate, aluminum silicate and combinations thereof. The activated carbon is preferably acidic activated carbon. The exchange resin is preferably a cation exchange resin. The bleaching agent can be neutral or activated bleaching agent. Activated bleaching agent refers to acid and/or physically activated (e.g. by thermal treatment). Activation includes the increase of the surface in order to improve the bleaching efficiency. Preferably an acid activated bleaching agent is applied. The acid is provided as an aqueous solution. The acid may include phosphoric acid, sulfuric acid, ascorbic acid, citric acid, erythorbic acid, acetic acid, malic acid or combinations of two or more thereof.

The amount of adsorbent is in the range of from 0.3 to 4 wt % by weight of oil, in the range from 0.4 to 3%, from 0.5 to 2.5%, from 0.6 to 2%, from 0.7 to 1.5%, from 0.8 to 1.2%.

The amount of acid that is added to the base-treated oil is equivalent or 15% less than, 10% less than, 5% less than the molar amount of $OH^-$ ions, or carboxylate (palmitate)-ions added during the treatment of the deodorized oil with a base. The acid may be added as an aqueous solution with a concentration of from 5-85%, from 20-70%, 30-60%. Typically, an 50% citric acid solution is used.

The temperature of the contacting step b) is in the range of from 70 to 120° C., in the range of 80 to 110° C., in the range of 85 to 100° C.

The contact time with the adsorbent and/or acid in step b) of the present process is in a range of from 15 to 60 minutes, from 20 to 50 minutes, from 30 to 45 minutes.

At the end of step b) the oil is separated from the adsorbent and/or soaps formed.

Without being bound by a theory, step b) of the process of the present invention allows to reduce the content of glycidyl esters (GE). The content of glycidyl esters can be reduced to below LOQ (limit of quantification). Thus, the content of glycidyl esters can be reduced to below 0.10 ppm. Furthermore, step b) allows to remove soap and/or reduce the color of the base treated oil.

Step b) of the process of the present invention may be a single step wherein the base treated oil is contacted with one or more adsorbents and/or one or more acids. Alternatively, step b) of the process may include multiple steps wherein the based treated oil is contacted with different adsorbents and/or acids in consecutive steps.

In one aspect of the invention, the process of the present invention includes a step b) of contacting the base treated oil with an adsorbent, or with an adsorbent and an acid.

In one aspect of the invention, the process of the present invention includes a step b) of contacting the base treated oil with an adsorbent and an acid and step b) is comprising:

b1) contacting the base-treated oil with an acid, b2) optionally removing the soap formed, and b3) contacting the base-treated oil with an acid-activated bleaching earth, wherein the acid in step b1) is phosphoric acid, sulfuric acid, ascorbic acid, citric acid, erythorbic acid, acetic acid, malic acid or combinations of two or more thereof, preferably citric acid.

In another aspect of the invention, the process of the present invention includes a step b) of contacting the base treated oil with an adsorbent and an acid and step b) is comprising:

b1) contacting the base-treated oil with an acid, b2) removing the soap formed, and b3) contacting the base-treated oil with an acid-activated bleaching earth, wherein the acid in step b1) is phosphoric acid, sulfuric acid, ascorbic acid, citric acid, erythorbic acid, acetic acid, malic acid or combinations of two or more thereof, preferably citric acid.

The soap in step b2) of the process of the present invention may be removed by contacting the oil obtained from step b1) with an adsorbent, such as bleaching earth or silica. Preferably, silica is used to remove soaps in step b2) of the process.

Contacting the based-treated oil first with an acid and removing the soap formed, may allow the acid-activated bleaching earth, that is subsequently added to the based-treated oil to reduce more effectively GE and color. As a result, less acid-activated bleaching earth may be needed.

After step b), the color of the base-treated oil is low. In one aspect of the invention, the base-treated palm based-oil after step b) of the present process is characterized by a Lovibond red colour of 3.5R or less, 3R or less, 2.5R or less, 2R or less and/or a Lovibond yellow colour of 35Y or less, 30Y or less, 25Y or less, 20Y or less (measured in a 5¼ inch glass measuring cell according to AOCS method Cc13e-92).

Further Fractionation Step and/or Refining Steps

In another aspect of the invention, the process is characterized in that it is comprising a further processing step carried out after step b) and wherein the further processing step is a fractionation step and/or a further refining step.

The present invention provides a process for manufacturing a refined vegetable oil having a reduced content of 3-MCPD esters characterized in that it comprises the following steps:

a) Treating a deodorized vegetable oil with a base in a continuous pipe reactor, b) Contacting the base-treated oil with an adsorbent and/or acid, c) Treating the oil of step b) in a further processing step.

In particular the further processing step is a fractionation step of the deodorized base-treated palm oil. The fatty acid distribution in palm oil lends itself into fractionation and the production of multiple fractions of palm oil. Palm oil fractions may comprise palm olein, palm stearin and fractions further obtained through re-fractionation, either from the palm olein or palm stearin, such as palm mid-fraction, double fractionated palm olein, also called super olein, double fractionated stearin, also called super stearin, and even further fractions obtained through re-fractionation of palm-mid fraction. The presence of trisaturated and disaturated triglycerides in the palm oil facilitates the formation of fat crystals, in particular as the oil is chilled. On the contrary, when the position of the fatty acids of the triglycerides is changed or disrupted by interesterification, the fractionation is hampered and will be cumbersome. By applying the process of the present invention, the degree of interesterification is kept low and thus the fractionation is facilitated. Any suitable fractionation method can be applied. In fact, the process of the present invention is beneficial for any subsequent step where oil crystallization can be a determining factor.

The present invention provides a process for manufacturing a refined palm oil fraction having a reduced content of 3-MCPD esters characterized in that it comprises the following steps:

a) Treating a deodorized palm oil with a base in a continuous pipe reactor, b) Contacting the base treated palm oil with an adsorbent, c) Treating the oil of step b) in a further processing step wherein the further processing step is a fractionation step.

d) Collecting the fractions obtained in step c).

In another aspect of the invention, the further processing step is a further refining step.

The "further refining step" in the present process is carried out at a temperature below 220° C., below 215° C., below 210° C., below 200° C., below 190° C., below 185° C., below 180° C., from 130 to 210° C., from 150 to 175° C.

The "further refining step" in the present process may result in a refined vegetable oil having a reduced content of 3-MCPD esters, a reduced content of GE and a taste that is acceptable to good. The refined vegetable oil has a content of the 3-MCPD esters below 2.5 ppm, below 1.9 ppm, below 1.8 ppm, 1.5 ppm, below 1.2 ppm, below 1 ppm, below 0.8 ppm. The GE content of the refined vegetable oil is below 1.0 ppm, below 0.7 ppm, below 0.5 ppm, or even below 0.3 ppm. The refined vegetable has an overall flavour quality score (taste), according to AOCS method Cg 2-83, in a range of from 7 to 10, or even from 8 to 10 (with 10 being an excellent overall flavour quality score and 1 being the worst score) or from 9 to 10.

The "further refining step" is carried out in a deodorizer, or preferably in an oil refining equipment consisting of a stripping column with packing and not more than one oil collection tray.

In one specific aspect, the "further refining step" is carried out in an oil refining equipment consisting of a stripping column with packing and not more than one oil collection tray. The refining ability of this refining equipment is obtained from the use of the stripping column and not more than one oil collection tray. It is to be understood that in order to operate the refining equipment, valves, pumps, heat exchangers (heating and/or cooling of the oil), and the like, are needed. An in-line heater may be used before the stripping column.

The "not more than one" oil collection tray is a range covering "up to one" collection tray, and thus including also no collection tray.

The "oil refining equipment" is not containing retention trays. Retention trays, retention vessels, or compartments, also known as sections, are always present in standard deodorizer equipment known in the art, whether batch, continuous or semi-continuous deodorizer equipment.

In each tray the oil is kept for a certain time at high temperature and steam is introduced into the oil.

It has been found that the height to diameter ratio of the stripping column of the oil refining equipment is from 0.1 to 10.

The packing can be random packing or structured packing. Preferably the packing is a structured packing.

The term structured packing is well-known in the technical field and it refers to a range of specially designed materials for use in absorption and distillation columns Structured packings typically consist of thin corrugated metal plates arranged in a way that force fluids to take complicated paths through the column and thereby creating a large surface, which can enhance the interaction between oil and stripping agent.

The packing in the equipment of the present invention is having a specific surface of from 100 to 750 $m^2/m^3$.

Furthermore, the stripping column of the oil refining equipment has an oil loading of from 0.5 to 4.0 $kg/m^2h$ surface of packing.

The "oil refining equipment" allows for a short residence (retention) time. In particular, a total residence time in the refining equipment, including not more than one collection tray, and including a pre-heating (using a heating device prior to passing the oil through the oil refining equipment), is not more than 20 minutes. More in particular, the process of the present invention allows a residence time in the packing of the stripping column of from 1 to 10 minutes.

These short residence times are further beneficial to avoid further formation of the process contaminants.

The stripping agent is steam or any other stripping gas, such as nitrogen gas. Preferably steam is used as stripping agent.

The stripping column is operated at an absolute pressure of below 8 mbar.

In one aspect of the invention, the process for manufacturing a refined vegetable oil with a reduced content of 3-MCPD esters is characterized in that it comprises the following steps:

a) Treating a deodorized vegetable oil with a base in a continuous pipe reactor,
b) Contacting the base treated oil with an adsorbent or an adsorbent and an acid,
c) Treating the oil of step b) in a further refining step carried out in a deodorizer at a temperature below 220° C., below 215° C., below 210° C., below 200° C., below 190° C., below 185° C., below 180° C., from 130 to 210° C., from 150 to 175° C.

In a further aspect of the invention, the process for manufacturing a refined vegetable oil with a reduced content of 3-MCPD esters is characterized in that it comprises the following steps:

a) Treating a deodorized vegetable oil with a base in a continuous pipe reactor,
b) Contacting the base treated oil with an adsorbent or an adsorbent and an acid,
c) Treating the oil of step b) in a further refining step carried out in a deodorizer at a temperature below 220° C., below 215° C., below 210° C., below 200° C., below 190° C., below 185° C., below 180° C., from 130 to 210° C., from 150 to 175° C., and Wherein the vegetable oil is palm oil, palm oil stearin, palm oil super stearin, palm oil olein, palm oil super olein, palm oil mid-fraction or blends of one or more thereof In a further aspect of the invention, the process for manufacturing a refined palm oil with a reduced content of 3-MCPD esters is characterized in that it comprises the following steps:

a) Treating a deodorized palm oil with a base in a continuous pipe reactor,
b) Contacting the base treated palm oil with an adsorbent or with an adsorbent and acid,
c) Treating the palm oil of step b) in a further refining step carried out in a deodorizer at a temperature below 220° C., below 215° C., below 210° C., below 200° C., below 190° C., below 185° C., below 180° C., from 130 to 210° C., from 150 to 175° C.,
d) Treating the palm oil of step c) in a fractionation step.
e) Collecting the fractions obtained in step d).

In yet another aspect of the invention, the process for manufacturing a refined vegetable oil with a reduced content of 3-MCPD esters is characterized in that it comprises the following:

a) Treating a deodorized vegetable oil with a base in a continuous pipe reactor,
b) Contacting the base treated oil with an adsorbent and/or acid,
c) Treating the oil of step b) in a further refining step carried out in in an oil refining equipment consisting of a stripping column with packing and not more than one oil collection tray and at a temperature below 220° C., below 215° C., below 210° C., below 200° C., below 190° C., below 185° C., below 180° C., from 130 to 210° C., from 150 to 175° C.

In yet another aspect of the invention, the process for manufacturing a refined vegetable oil with a reduced content of 3-MCPD esters is characterized in that it comprises the following:

a) Treating a deodorized vegetable oil with a base in a continuous pipe reactor,
b) Contacting the base treated oil with an adsorbent and/or acid,
c) Treating the oil of step b) in a further refining step carried out in in an oil refining equipment consisting of a stripping column with packing and not more than one oil collection tray and at a temperature below 220° C., below 215° C., below 210° C., below 200° C., below 190° C., below 185° C., below 180° C., from 130 to 210° C., from 150 to 175° C., and Wherein the vegetable oil is palm oil, palm oil stearin, palm oil super stearin, palm oil olein, palm oil super olein, palm oil mid-fraction or blends of one or more thereof In another aspect of the invention, the process for manufacturing a refined palm oil with a reduced content of 3-MCPD esters is characterized in that it comprises the following:

a) Treating a deodorized palm oil with a base in a continuous pipe reactor,
b) Contacting the base treated palm oil with an adsorbent and/or acid, c) Treating the palm oil of step b) in a further refining step carried out in an oil refining equipment consisting of a stripping column with packing and not more than one oil collection tray and at a temperature below 220° C., below 215° C., below 210° C., below 200° C., below 190° C., below 185° C., below 180° C., from 130 to 210° C., from 150 to 175° C.,
d) Treating the palm oil of step d) in a fractionation step,
e) Collecting the fractions obtained in step e).

The current invention further relates to the use of a continuous pipe reactor for treating a deodorized vegetable oil with a base. Furthermore, the current invention relates to the use wherein 3-MCPD ester content is reduced in deodorized vegetable oil.

The use of the continuous pipe reactor allows the reduction of 3-MCPD esters in the deodorized vegetable oil. The plug flow or the approached plug flow allows for a uniform reaction and a robust process that is not easily negatively affected by the intentional or unintended change of parameters such as residence time, dosage of base and/or temperature, more specifically the residence time. Stalling or otherwise elongating the residence time in the continuous pipe reactor will not have a negative impact on the degree of interesterification, increase of degree of interesterification over time, degree of DAK formation and/or increase of degree of DAK formation over time. Moreover, the continuous pipe reactor can operate at atmospheric pressure or close to atmospheric pressure and is thus less complex and more energy efficient than for example a regular deodorizer.

The continuous pipe reactor is operated at a temperature from 160 to 220° C.

Analytical Methods

Measurement of the Degree of Interesterification

The degree of interesterification (INES) is evaluated based on the POP/PPP (P=palmitic, O=oleic) ratio from the triglyceride (TAG) composition. TAG composition was analyzed by reversed-phase HPLC using a combination of a Nucleodur C18 Isis 5µm, 250×4.6 mm and a Kinetex C18 2.6 µm, 150×4.6 mm. Detection is performed using an Evaporative light scattering detector (ELSD) with a drift tube temperature of 31.5° C., nebulizer temperature of 12° C. and a gas pressure of 20 psi.

The mobile phase is an isocratic solvent mixture of tetrahydrofuran, acetonitrile and methanol (28:54:18) with a flow of 1.2 ml/min. About 50 mg of samples is dissolved in 7 ml 100% tetrahydrofuran and injected with a volume of 10µl.

The INES content is calculated using a POP/PPP ratio calibration equation determined from standards made from input palm oil and 100% chemical interesterified palm oil in the range of 0-14%. Correlation coefficient=0.9998 with a LOQ of 2.1% and a STDv of 0.041.

Measurement of DAK Content

We recite here the key-points of the method used to analyze DAK content. Every detail of the method is made available in WO2009/012982 on page 17 to 22.

Sample Preparation:

Saponification: 1 ml sample (exact weight is recorded) is heated until it is fully melted. 10 ml 2N ethanolic KOH solution is added to the 1 ml sample and heated for 20 minutes at 90° C. in a closed container. The container is cooled to room temperature and 10 ml of water is added to dissolve the soaps. If necessary, the sample can be heated until the soaps are dissolved.

Extraction of unsaponifiable: Subsequently 5 ml of petroleum ether is added to that solution and mixed several times with a shaker. The complete petroleum ether layer is transferred to a second container and the extraction is repeated twice. Petroleum ether phase of all extractions are collected.

Washing of the extract: 10 ml of water/ethanol (1:1) solution is added to the collected petroleum ether phases and mixed several times with the aid of a shaker. The petroleum ether phase is collected and the washing step is repeated.

Drying & dissolving: the washed petroleum ether layer is evaporated under a gentle flow of nitrogen. The dried residue is dissolved in 4 ml of a toluene/hexane (1:1).

HPLC Analysis:

The samples are analyzed on a HPLC system under the following conditions:

Alltech Econosphere Silica HPLC column (150*4.6 mm, 3 µm). flow: 0.9 ml/min injection volume: 20 µl detector: Evaporative light scattering detector ELSD (drift-tube: 75° C.; nebuliser: 1.75 SLPM (standard liters per minute nitrogen)

The mobile phase is a gradient hexane, ethylacetate and Toluene containing 2.5 ml/I formic acid):

| | Mobile phase | | |
|---|---|---|---|
| Time (min) | Hexane | Ethylacetate | Toluene (2.5 ml/I formic acid) |
| 0 | 50 | 0 | 50 |
| 5 | 50 | 0 | 50 |
| 8 | 0 | 25 | 75 |
| 10 | 0 | 25 | 75 |
| 13 | 50 | 0 | 50 |
| 25 | 50 | 0 | 50 |

Amount of DAK is calculated by comparing it to a calibration curve of standard solutions of DAK.

Measurement of 3-MCPD & GE

3-MCPD and GE are measured according to Method DGF Standard Methods Section C (Fats) C-VI 18(10).

EXAMPLES

Comparative Example

In a first test, crude palm was degummed and bleached according to standard refining conditions for physical refined palm oil. 3-MCPD ester content of the oil was measured, as well as the degree of interesterification and DAK content. Results are presented in table 1 as "RBD palm oil without alkali treatment".

In a second test, the crude palm oil was degummed and bleached according to standard refining conditions. Subsequently 75 ppm of a 20 weight % KOH-solution, corresponding to 4.55 ppm $OH^-$, was added to the bleached oil prior to entering the deodorizer. Deodorization was carried out at 252° C., for 90 minutes, at an absolute pressure in a range of 2.5 to 4 mbar and using 0.57% sparge steam. 3-MCPD ester content of the oil was measured as well as the degree of interesterification and the content of DAK. Results are presented in table 1 as "RBD palm oil including alkali treatment".

TABLE 1

| | 3-MCPD esters | Degree of interesterification | DAK |
|---|---|---|---|
| RBD palm oil without alkali treatment | 5.9 ppm | — | — |
| RBD palm oil including alkali treatment | 1.6 ppm | 16% | 7 ppm |

Example 1

Crude palm oil was degummed according to conditions known in the art. The degummed palm oil was subsequently bleached at 90° C. for 30 min, using 1.5% acid activated bleaching earth. After removing the bleaching earth, the oil was subsequently deodorized at a temperature of 245° C. during 3 h at pressure of 3 mbar, using 1% of sparge steam per hour. RBD palm oil was obtained.

3-MCPD ester content was measured for the RBD palm oil. Result is presented in table 2.

The RBD palm oil was used as staring material for the process according to the teachings of the invention. The oil was treated according to process steps 1) to 3) as described here below.

Step 1) Base Treating the Oil in a Continuous Pipe Reactor

The RBD palm oil was added to a continuous pipe reactor at a flow rate of 22 kg/hour.

The pipe reactor had a cylindrical height of 1420 mm and an internal diameter of 258 mm and a torispheric head and bottom. The piper reactor was filled with the oil up to the level of 1100 mm of the cylindrical part. The height/diameter ratio was 4.26 (1100 height of the oil/258 internal diameter of the reactor=4.26).

A 20 weight % solution of KOH was added to the oil at a flow rate of 30.8 mg/minute prior to entering the reactor. This corresponded to a KOH concentration in the oil of 16.8 ppm (equivalent to 0.30 mmol KOH/kg of oil or 5.1 ppm hydroxide ions ($OH^-$)). The oil containing the KOH solution was directed into the pipe reactor through a spray nozzle to distribute the oil over the cross section area of the oil in the reactor. The oil flowed from top to bottom through the continuous pipe reactor.

The residence time of the oil in the reactor was 130 minutes.

The oil in the pipe reactor was kept at 200° C. and at atmospheric pressure.

3-MCPD ester content, degree of interesterification and DAK content of the base-treated oil after step 1) was measured. Results are presented in table 2.

Step 2) Contacting Base-Treated Oil with an Adsorbent

The base-treated oil from step 1) was subsequently treated with 0.7 weight % acid activated bleaching earth on total weight of the oil. The oil was treated for 20 minutes at 100° C. at a pressure of 170 mbar.

3-MCPD ester content, degree of interesterification and DAK content of the base-treated oil after bleaching in step 2) was measured. Results are presented in table 2.

Step 3) Further Refining of the Bleached Base-Treated Oil

The bleached base-treated oil was further refined using a stripping column. The oil was loaded onto the stripping column at a flow rate of 22.4 kg/h, with an oil loading 2.5 $kg/m^2h$ surface of packing, resulting in a residence time of 3.2 min.

The temperature was 193° C. The vacuum in the stripping column was maintained constant at about 2.5 mbar. Stripping steam (0.3 wt % relative to the oil flow) was used in counter-current mode to facilitate removal of volatile compounds.

3-MCPD ester content, degree of interesterification and DAK content of the base-treated oil after bleaching and stripping in step 3) was measured. Results are presented in table 2.

TABLE 2

| | 3MCPD-ester | GE | Degree of interesterification | DAK |
|---|---|---|---|---|
| RBD palm oil | 3.1 ppm | 15.8 ppm | — | — |
| Base-treated oil after step 1) | 1.1 ppm | 14.8 ppm | 3.4% | <1 ppm |
| Base-treated oil after bleaching (step 2) | 1.1 ppm | 0.2 ppm | 3.4% | <1 ppm |
| Base-treated oil after bleaching & stripping (step 3) | 1.1 ppm | 0.2 ppm | 3.4% | <1 ppm |

The treatment with a base allowed a reduction of 3-MCPD esters of 65%.

The oil obtained after the stripping column had an overall flavour quality score of at least 8 according to AOCS method Cg 2-83 (with 10 being an excellent overall flavour quality score and 1 being the worst score). This oil had a red color according to specifications for refined palm oil of max 3R.

In all steps the content of INES and DAK was kept low. DAK below LOQ, i.e. below 1 ppm and INES below 5%.

Example 2

The step of base treatment of the RBD palm oil was demonstrated for different types of bases.

RBD palm oil was treated for 90 minutes, at a temperature of 200° C. under atmospheric pressure with alkali in an amount of 0.18 mmol/kg oil, corresponding to 3 ppm of hydroxide ions ($OH^-$).

3-MCPD ester content, interesterification degree and DAK content were measured. Results are shown in table 3.

TABLE 3

| | 3-MCPD ester | Degree of interesterification | DAK |
|---|---|---|---|
| RBD palm oil | 3.1 ppm | — | — |
| Base added to RBD palm oil in an amount of 0.18 mmol/kg oil | | | |
| KOH* | 1.5 ppm | 2.9% | <1 ppm |
| NaOH* | 2.3 ppm | 2.2% | <1 ppm |
| K-palmitate** | 1.3 ppm | 2.2% | <1 ppm |

*added as a 20 weight% solution

**added as pure component

Content of INES and DAK was kept low. DAK below LOQ and INES below 3%.

Content of 3-MCPD was reduced with 26 up to 58%.

Example 3

The step of base treatment of the vegetable deodorized oil at different temperatures, as well as the degree of interesterification and DAK formation per hour of retention time of the base-treated oil into the pipe reactor was demonstrated.

RBD palm oil was treated at a temperature of 180 and 200° C. under atmospheric pressure with potassium hydroxide in an amount corresponding to 3 ppm of hydroxide ions ($OH^-$).

3MCPD content, interesterification degree and DAK content were measured.

Results are shown in table 4.

TABLE 4

| | 3-MCPD ester | Degree of interesterification | DAK |
|---|---|---|---|
| RBD palm oil | 4.1 ppm | — | — |
| RBD palm oil treated with 3 ppm $OH^-$ | | | |
| Treatment Temperature / Treatment Time | | | |
| 180° C. 30 min | 2.6 ppm | 0.4% | <1 ppm |
| 60 min | 2.4 ppm | 0.5% | <1 ppm |
| 90 min | 2.1 ppm | 0.7% | <1 ppm |
| 120 min | 1.7 ppm | 1.0% | <1 ppm |
| 200° C. 30 min | 2.1 ppm | 0.6% | <1 ppm |
| 60 min | 1.6 ppm | 1.5% | <1 ppm |
| 120 min | 1.1 ppm | 2.0% | <1 ppm |

The invention claimed is:

1. A process for manufacturing a refined vegetable oil, the process comprising:

A) treating a deodorized vegetable oil with a base in a continuous pipe reactor to obtain a base treated oil, wherein the deodorized vegetable oil comprises 2.5 ppm or more of 3-monochloropropane-1,2-diol fatty acid (3-MCPD) ester, and wherein the continuous pipe reactor is arranged to provide a retention time having a standard deviation of 40% or less of a mean residence time within the continuous pipe reactor, and B) contacting the base treated oil with an adsorbent, an acid, or a combination thereof, wherein the refined vegetable oil comprises below 2.5 ppm of the 3-MCPD ester.

2. The process according to claim 1 wherein the deodorized vegetable oil in step A) has a 3-MCPD ester content of 4 ppm or more.

3. The process according to claim 1, wherein the treating of the deodorized vegetable oil is performed at a temperature from 160 to 220° C.

4. The process according to claim 1, wherein the base is added in a concentration of from 0.06 to 2.35 mmol/kg oil.

5. The process according to claim 1, wherein the base is a hydroxide and is added in a concentration of 1 to 40 ppm molar equivalents of hydroxide ions.

6. The process according to claim 1 further comprising a fractionation step and/or a further refining step carried out after the contacting of the base treated oil.

7. The process according to claim 6 wherein the further refining step is carried out in a deodorizer or an oil refining equipment consisting of a stripping column with packing and not more than one oil collection tray.

8. The process according to claim 7 wherein the further refining step is carried out at a temperature below 220° C.

9. The process according to claim 1, wherein the deodorized vegetable oil comprises a vegetable oil having undergone deodorization, wherein the vegetable oil comprises one or more of soybean oil, corn oil, cottonseed oil, palm oil, palm kernel oil, peanut oil, rapeseed oil, safflower oil, sesame seed oil, rice bran oil, coconut oil, canola oil, or blends thereof.

10. The process according to claim 1, wherein the deodorized vegetable oil comprises deodorized palm oil, deodorized palm oil stearin, deodorized palm oil super stearin, deodorized palm oil olein, deodorized palm oil mid-fraction, or blends thereof.

11. The process according to claim 1, wherein the deodorized vegetable oil is deodorized palm oil.

12. The process according to claim 1 further comprising subjecting a crude vegetable oil to a physical refining step to obtain the deodorized vegetable oil, wherein the physical refining step comprises degumming, bleaching, and deodorizing the crude vegetable oil.

13. The process according to claim 1 further comprising a further refining step after the contacting of the base treated oil, carried out in an oil refining equipment consisting of a stripping column with packing and not more than one oil collection tray at a temperature from 130 to 210° C., wherein the stripping column has an oil loading of from 0.5 to 4.0 kg/m2h surface of packing.

14. The process according to claim 13, wherein the further refining step comprises use of a stripping agent comprising steam.

15. The process of claim 1, wherein the refined vegetable oil comprises below 1.8 ppm of the 3-MCPD ester.

16. The process of claim 1, wherein the treating of the deodorized vegetable oil is performed without injecting steam or gas into the deodorized vegetable oil.

17. The process of claim 1, wherein the process induces a degree of interesterification of below 10%.

18. The process of claim 1, wherein the process induces a formation of below 6.0 ppm of dialkylketones (DAK).

19. The process of claim 1, wherein the continuous pipe reactor has a height to diameter ratio from 3.0 to 20.0.

* * * * *